(12) United States Patent
Greene et al.

(10) Patent No.: US 8,147,713 B2
(45) Date of Patent: Apr. 3, 2012

(54) COMPOSITION AND METHOD FOR SCALE REMOVAL AND LEAK DETECTION

(75) Inventors: Jeffrey A. Greene, Sterling Heights, MI (US); Ronald A. Koehler, Independence, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1110 days.

(21) Appl. No.: 11/427,944

(22) Filed: Jun. 30, 2006

(65) Prior Publication Data

US 2008/0001119 A1    Jan. 3, 2008

(51) Int. Cl.
*C02F 5/10* (2006.01)
*C02F 5/02* (2006.01)
*C02F 5/08* (2006.01)

(52) U.S. Cl. .. 252/180; 252/79.1; 252/175; 252/301.36; 134/3; 134/22.19; 134/41

(58) Field of Classification Search ............... 252/79.1, 252/301.36, 175, 180, 301, 36; 510/247, 510/259, 238, 206, 100, 176, 321, 269, 253; 134/3, 22.1, 26, 22.19, 41; 106/12, 14.13; 430/329; 210/701; 73/40.7
See application file for complete search history.

(56) References Cited

U.S. PATENT DOCUMENTS

| | | | | |
|---|---|---|---|---|
| 2,612,510 | A | | 9/1952 | Hatcher et al. ............. 260/448.2 |
| 2,784,220 | A | | 3/1957 | Spiegler ...................... 260/510 |
| 4,439,339 | A | * | 3/1984 | Doumit ........................ 510/100 |
| 4,820,344 | A | * | 4/1989 | Geke et al. .................. 106/14.13 |
| 4,971,631 | A | * | 11/1990 | Sallee et al. ................. 510/100 |
| 5,082,578 | A | | 1/1992 | Langer et al. ................. 252/8.7 |
| 5,269,957 | A | * | 12/1993 | Ikeda et al. .................... 510/269 |
| 5,346,626 | A | | 9/1994 | Momozaki et al. ............. 210/701 |
| 5,424,000 | A | * | 6/1995 | Winicov et al. ............... 510/100 |
| 5,588,989 | A | * | 12/1996 | Vonk et al. .................. 106/14.12 |
| 5,607,911 | A | * | 3/1997 | Levin et al. ................... 510/253 |
| 5,972,868 | A | * | 10/1999 | Athey et al. ................... 510/247 |
| 6,309,470 | B1 | * | 10/2001 | Schulhoff et al. ............... 134/26 |
| 6,310,024 | B1 | | 10/2001 | Gill et al. ...................... 510/247 |
| 6,992,053 | B2 | * | 1/2006 | Cermenati et al. ............ 510/238 |
| 2006/0157090 | A1 | * | 7/2006 | Zeiher et al. ................. 134/56 R |
| 2007/0125156 | A1 | * | 6/2007 | Werner .......................... 73/40.7 |

* cited by examiner

*Primary Examiner* — Ling Choi
*Assistant Examiner* — Bijan Ahvazi
(74) *Attorney, Agent, or Firm* — Christine W. Trebilcock; Donald R. Palladino; William J. Uhl

(57) ABSTRACT

A method and composition for scale removal and leak detection is disclosed. The composition comprises a scale-removal agent and a fluorescing agent.

8 Claims, No Drawings

COMPOSITION AND METHOD FOR SCALE REMOVAL AND LEAK DETECTION

FIELD OF THE INVENTION

The present invention relates to compositions and methods for scale removal and leak detection.

BACKGROUND OF THE INVENTION

It is known that industrial systems such as boiler systems, cooling tower systems, heat exchanger systems and metal pretreatment systems are subject to formation of deposits on the internal surfaces that are in contact with the components circulating through the system. The cause of the deposits or scale can be from chemical reaction of the components circulating through the system with the internal surfaces of the plumbing or other areas of the system or can be caused by the components precipitating on the internal surfaces of the system. For example, in steel-based systems that circulate aqueous compositions, iron oxide or rust will build up on the interior surfaces of the system. In metal pretreatment systems using aqueous acidic solutions of metal phosphates such as zinc phosphate, the metal phosphates over time will eventually precipitate from solution and build up on the interior surfaces of the system.

The scale is often corrosive to steel plumbing and can penetrate through the steel. Leakage is often not detected because the deposit plugs the perforation. However, when the scale is removed in a cleaning operation, the perforations will be the site of subsequent leakage requiring that the system be shut down, the contents of the system removed so that the perforations can be repaired.

It would be desirable to have a method to remove scale while being able to detect leaks in the system before the system is recharged after cleaning. The present invention provides such a method and a composition for use in the method.

SUMMARY OF THE INVENTION

The present invention provides a composition for scale removal and leak detection in a system that contains scale-causing components. The composition comprises:
(a) a scale-removal agent and
(b) a fluorescing agent.

The system is treated with the compositions of the invention to remove the scale and the exterior of the system is inspected with ultraviolet light to detect leaks as evidenced by signs of fluorescence.

DETAILED DESCRIPTION OF THE INVENTION

Examples of systems that can be treated with the compositions and the methods of the invention include systems that circulate water or aqueous compositions of components through the system. Specific examples include boiler systems, cooling tower systems, heat exchanger systems, desalination systems, paper mills, heating/cooling systems, fire service water, reactors and metal pretreatment systems. Metal pretreatment systems are based on acidic aqueous solutions of metal phosphates such as zinc phosphate compositions and are used to pretreat metal objects such as car bodies. The systems comprise a containment bath through which the car body is passed and plumbing to add fresh composition, remove spent composition and to recirculate the contents of the bath. Besides zinc, other metal cations are included in the metal pretreatment bath and may include iron, manganese, magnesium, nickel and cobalt, including mixtures thereof. Anions derived from added acids or from salts of the above-mentioned metals such as nitrates, phosphates and sulfates, are also included in the bath. The various salts and acids are dissolved in water and have a solids content typically of about 1 to 10 percent by weight and a pH of about 1 to 6.

After repeated car bodies have passed through the bath, zinc phosphate precipitates from solution and deposits on the walls of the containment tank and on the interior surfaces of the plumbing. The deposits or scale must be removed, particularly to insure proper flow through the plumbing. To remove the deposits, the system is typically shut down, drained of the aqueous zinc phosphate solution, and the system is treated with an acidic solution of an inorganic acid such as sulfuric, phosphoric, or nitric acid, to dissolve the scale and flush it out of the system. However, this operation will not detect any leaks that may have formed in the system.

Treatments with the compositions and with the method of the invention overcome these difficulties.

The compositions of the present invention comprise a scale-removing agent and a fluorescing agent. The term "scale" is meant to include deposits that form on the interior surfaces of various industrial systems, such as those mentioned above and include deposits of the components circulating through the system that precipitate on the interior surface, and deposits from chemical reaction of the components with the interior surfaces, such as rust that forms with aqueous-based compositions circulating through a steel system. Examples of scale-removal agents are acidic materials such as aqueous solutions of organic or inorganic acids such as formic acid, acetic acid, sulfamic acid, citric acid, hydrochloric acid, sulfuric acid, nitric acid, and phosphoric acid. The concentration of the acid is typically within the range of 0.025 to 50 percent by weight based on total composition weight. The composition can be in the form of a concentrate typically containing 5 to 50 percent by weight acid and from 0.025 to 20 percent by weight acid when diluted with water at the job site.

Examples of other scale-removal agents are chelating agents that are particularly effective when the scale comprises iron oxide. Chelating agents such as ethylenediamine tetraacetic acid function by locking the metal contained in the scale in a soluble organic ring structure. However, chelating agents are selective with particular metal cations being removed and cannot be used with a wide variety of scale.

Examples of still other scale-removal agents are aminoalkyl phosphonates and carboxyalkyl aminoalkyl hydroxyaryl sulfonic acids.

However, aqueous solutions of inorganic acids are preferred because they are effective in removing most varieties of scale.

The fluorescing agent is typically selected from a fluorescent dye and/or an optical brightener. These materials, when exposed to ultraviolet light, absorb the ultraviolet light and convert the energy taken up into longer wavelength visible portions of the spectrum as evidenced by fluorescence.

Classes of fluorescent dyes that may be used include pyrannines, rhodamines, stilbenes; coumarin and carbostyril compounds; 1,3-diphenyl-2-pyrazolines; naphthalimides; benzazdyl substitution products of ethylene, phenylethylene, stilbene and thiophene. Among fluorescent dyes that may be used are also the sulfonic acid salts of diamino stilbene derivatives such as taught in U.S. Pat. No. 2,784,220 to Spiegler or U.S. Pat. No. 2,612,510 to Wilson et al. Optical brightness or fluorescent whitening agents as taught in U.S. Pat. No. 5,082,578 are also contemplated by this invention. Specific examples include Optiblanc MTB and Optiblanc NW (Stilbene triazine derivatives). These are available from 3V Sigma, S.p.A. of Bergamo, Italy.

Fluorescent dyes particularly useful in the invention include D96183 Chromatint Pyranine LIQ. 1568 and D23041 Chromatint Rhodamine B Liquid, both supplied by Chromatera, Inc.

The fluorescent agent is typically present in the composition in amounts of at least 10 parts per million. When present in the concentrate, the fluorescent agent may be present in amounts of at least 0.025 percent by weight based on total composition weight and at least 10 parts per million when the concentrate is diluted with water at the job site.

The compositions of the invention can also contain optional ingredients such as surface active agents to help suspend the scale that is removed with the compositions of the invention. The surfactants may include one or more surfactants selected from nonionic, anionic, cationic and zwitterionic surfactants. When present, the surfactants are present in amounts of up to 30 percent by weight based on total weight of the composition.

Examples of other optional ingredients include organic solvents, anti-foaming agents and corrosion inhibitors. These ingredients when present are used in amounts of up to 10 percent by weight based on total weight of the composition.

The system that is to be treated with the compositions of the invention is preferably shut down and drained of components contained within the system during the operation. The composition of the invention is then introduced into the system into all of the lines, pipes and containers and circulated throughout the system. The composition is preferably circulated at atmospheric pressure and at a temperature within the range of 10 to 95° C.

After the system has been cleaned and the scale removed, the exterior of the system is examined by shining ultraviolet light on the exterior parts of the system. Any perforations or leaks in the system will be detected by the fluorescence of the composition leaking through the perforation.

A useful source of ultraviolet radiation is a mercury vapor lamp filtered optically such that only those emissions between 250 and 400 nanometers (nm) are incident to the area being inspected. Alternate light sources include xenon lamps and tungsten lamps. It is preferred that the energy range of the light source is coincident with one or more electronic absorption bands in the fluorescing agent but not coincident with that of the fluorescent emissions of the fluorescing agent.

The present invention will now be illustrated by the following non-limiting examples.

EXAMPLES

The following examples are intended to illustrate compositions of the invention, and should not be construed as limiting the invention in any way.

Example 1

The compositions below are concentrated acid scale removers that can be used to remove scale associated with deposits in a metal phosphate pretreatment system. The concentrate can be diluted with water in a 80 to 1 (water to concentrate) volume ratio at the application site.

| Ingredients | Parts by Weight |
| --- | --- |
| Water | 76.1 |
| 93% Sulfuric Acid | 23.7 |
| Surfactant[1] | 0.1 |
| Dye[2] | 0.1 |
| Hydrochloric Acid 20 Baume | 98.8 |
| Corrosion Inhibitor[4] | 1.0 |
| Defoamer[3] | 0.1 |
| Dye[2] | 0.1 |

[1]DOWFAX 2A1 from Dow Chemical Co.
[2]D96183 Chromatint Pyranine Liquid 156 from Chromatera.
[3]TROYKYD D336 from Troy Chemical.
[4]RODINE 213 from Henkel.

Example 2

The following composition is a concentrated scale remover that can be used to remove scale with deposits associated with a heat exchanger. The concentrate can be diluted with water in a 1 to 1 volume ratio at the application site.

| Ingredients | Parts by Weight |
| --- | --- |
| Water | 38.08 |
| 75% Phosphoric Acid | 46.60 |
| Nitric Acid 42 Baume | 14.90 |
| Surfactant[1] | 0.32 |
| Dye[2] | 0.10 |

[1]NIA PROOF Anionic Surfactant 08 from Niacet.
[2]D23041 Chromatint Rhodamine B Liquid from Chromatera.

Example 3

The following composition is a concentrated scale remover that can be used to remove scale (rust) associated with a mild steel cleaning tank. The concentrate can be diluted with water in a 10 to 1 volume ratio at the application site.

| Ingredients | Parts by Weight |
| --- | --- |
| Water | 77.7 |
| Anhydrous Citric Acid | 20.0 |
| Diethylene glycol monobutyl ether | 2.0 |
| Surfactant[1] | 0.2 |
| Dye[2] | 0.1 |

[1]Surfonic N-120 from Huntsman.
[2]D23041 Chromatint Rhodamine B Liquid from Chromatera.

While the invention has been shown and described with references to the preferred embodiments thereof, it is understood by those skilled in the art that the foregoing and other changes in form and detail can be made therein without departing from the spirit and the scope of the invention.

What is claimed is:
1. A method for scale removal and leak detection in an aqueous metal pretreatment system containing metal phosphates comprising plumbing to contain and recirculate scale-causing components in the system comprising:
(a) treating the system with a composition comprising an acidic scale removal agent and a fluorescing agent so as to remove scale from the system,
(b) inspecting the exterior surfaces of the system by shining ultraviolet light incident to the exterior surface to detect any perforations in the system as evidenced by fluorescence of the fluorescing agent leaking through the perforation.

2. The method of claim 1 in which the metal phosphates are selected from the group consisting of zinc, iron, manganese, magnesium, nickel, and cobalt.

3. The method of claim 1 in which the fluorescing agent is selected from the group consisting of a fluorescent dye and an optical brightener.

4. The method of claim 1 in which the composition further comprises a surfactant.

5. The method of claim 1, wherein the acidic scale removal agent is an inorganic acid comprising hydrochloric acid.

6. The method of claim 1, wherein the acidic scale removal agent is an inorganic acid comprising sulfuric acid.

7. The method of claim 1, wherein the acidic scale removal agent is an inorganic acid comprising nitric acid.

8. The method of claim 1, wherein the acidic scale removal agent is an inorganic acid comprising phosphoric acid.

* * * * *